Nov. 17, 1931. L. A. FEDERER 1,831,952
POULTRY COOP
Filed Dec. 13, 1930 2 Sheets-Sheet 1
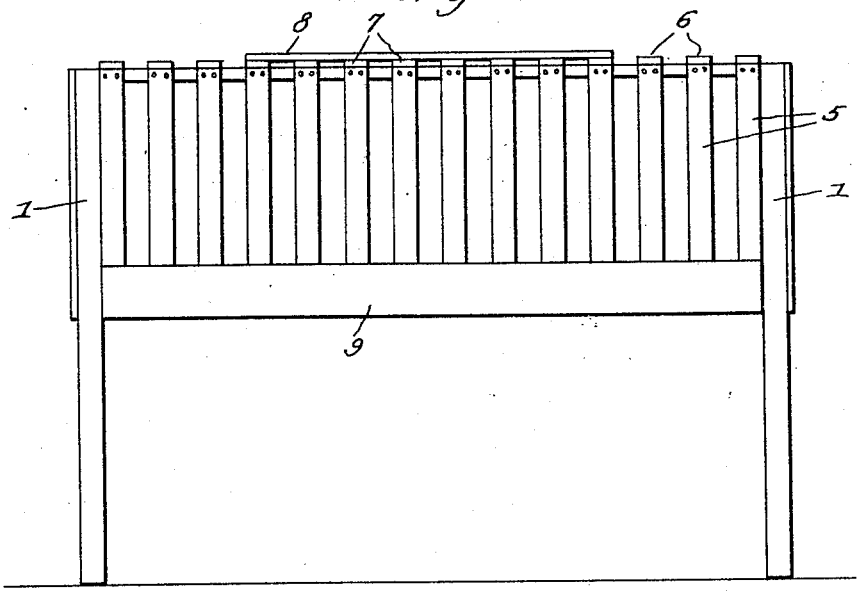
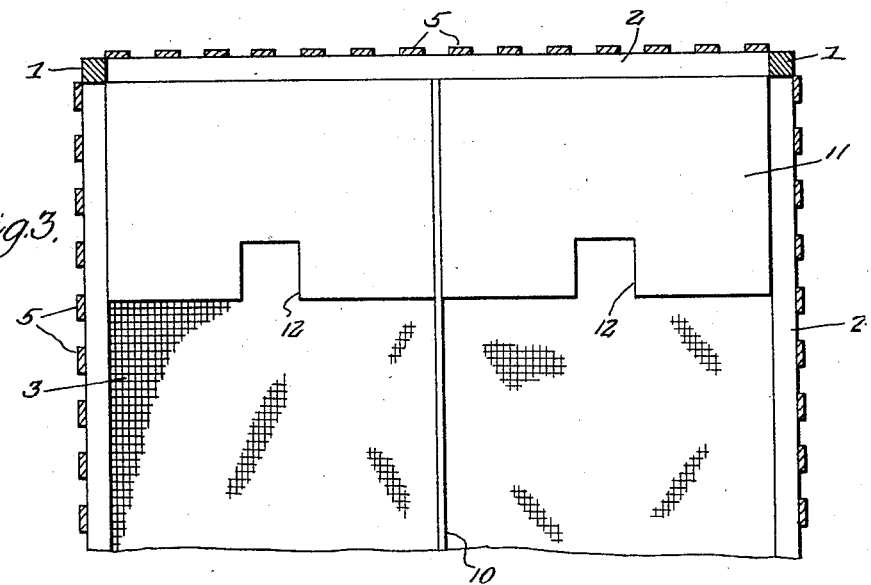
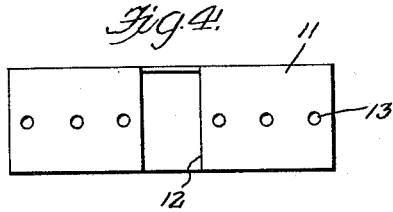
Inventor
Louis A. Federer,
By *Clarence A. O'Brien*
Attorney

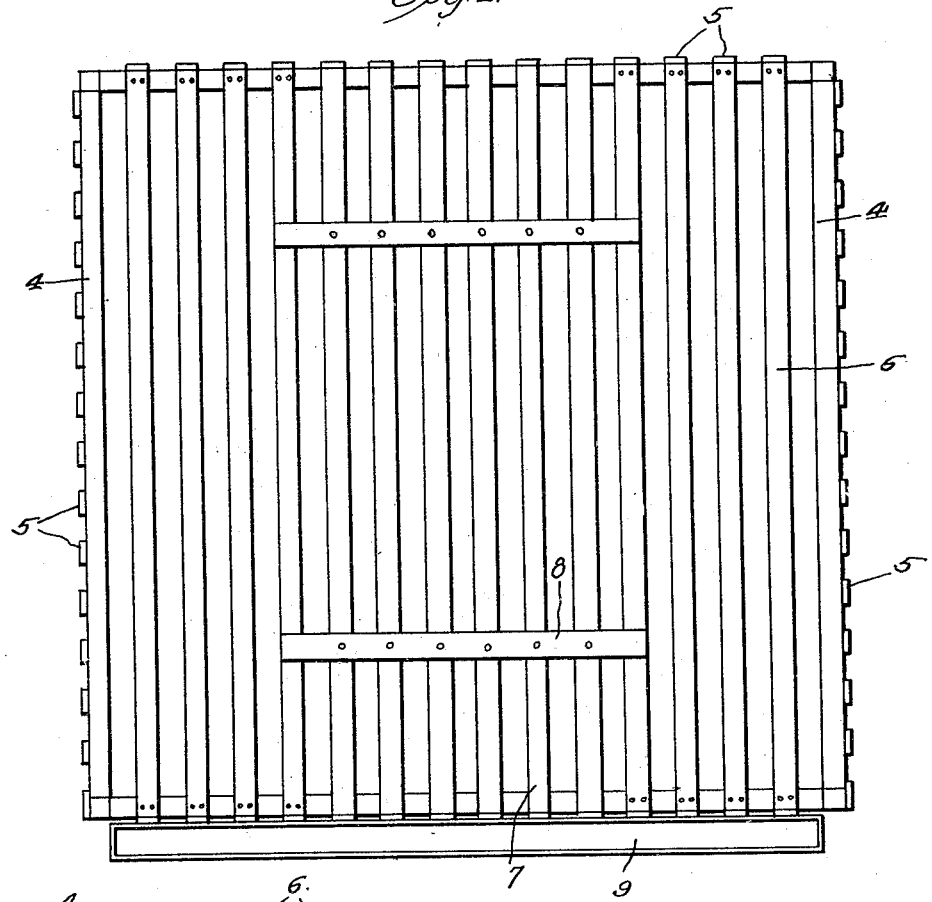
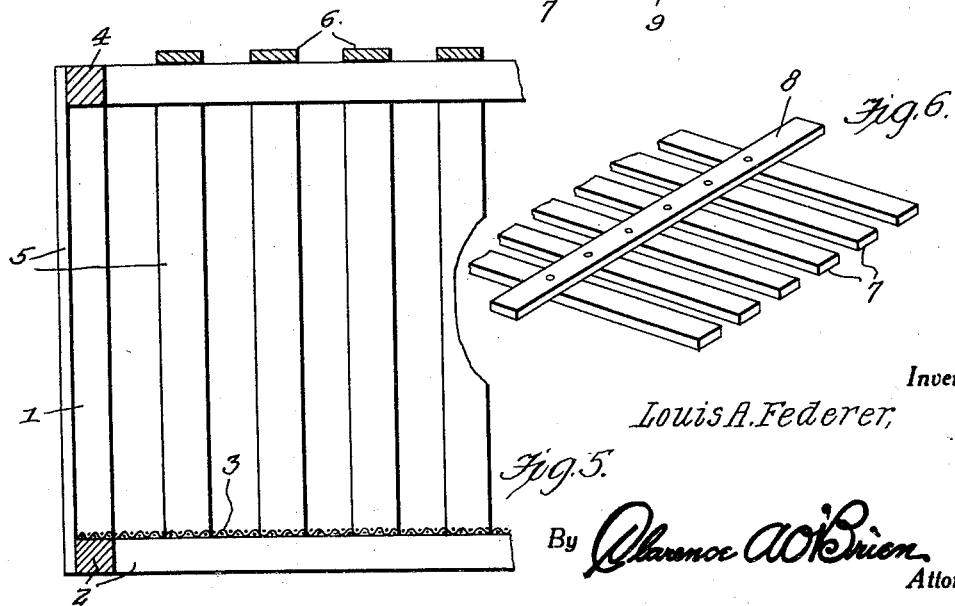

Patented Nov. 17, 1931

1,831,952

UNITED STATES PATENT OFFICE

LOUIS ANTHONY FEDERER, OF OWENSMOUTH, CALIFORNIA

POULTRY COOP

Application filed December 13, 1930. Serial No. 502,224.

This invention relates to a new and useful improvement in poultry coops and has for its primary object to provide, in a manner as hereinafter set forth, a poultry coop embodying a novel construction and arrangement of parts whereby proper sanitation and ventilation will be assured for maintaining and promoting the health and growth of the poultry which is kept therein.

Other objects of the invention are to provide a poultry coop of the character described which will be simple in construction, strong, durable, efficient, and which may be constructed at low cost.

All of the foregoing and still further objects and advantages of the invention may become apparent from a study of the following specification, taken in connection with the accompanying drawings wherein like characters of reference designate corresponding parts throughout the several views, and wherein :—

Figure 1 is a view in front elevation showing a poultry coop constructed in accordance with this invention.

Figure 2 is a view in top plan thereof.

Figure 3 is a fragmentary view in horizontal cross section through the coop showing the device with a removable partition therein providing a pair of compartments in each of which a chick box is disposed.

Figure 4 is a detail view in elevation of one of the chick boxes.

Figure 5 is a fragmentary view in vertical cross section showing the construction of the coop.

Figure 6 is a fragmentary detail view in perspective showing one end portion of the removable top closure.

Referring to the drawings in detail, it will be seen that the reference numeral 1 designates corner posts between intermediate portions of which extend the bars 2 to the upper sides of which the marginal portions of a wire mesh bottom 3 are secured. The corner posts 1 extend below the horizontal bars 2 in a manner to provide supporting legs of any suitable length to support the coop in elevated position with respect to the ground or floor of a building.

Extending between the upper end portions of the corner posts 1 are the upper horizontal bars 4. As will be obvious, the ends of the upper horizontal bars 4 and the lower horizontal bars 2 are secured to the corner posts 1 in any suitable manner. It will thus be seen that a rigid frame has been provided which is supported in elevated position.

Vertical spaced slats 5 have their upper and lower end portions secured to the outer sides of the horizontal bars 4 and 2 in a manner to provide the front, rear and opposite sides of the coop. Spaced, parallel, horizontally disposed slats 6 extend between the front and rear upper horizontal bars 4 and have their end portions secured thereto by suitable means in a manner to provide the side portions of the top of the coop and leave an opening in said top whereby access may be had to the interior of the coop. A removable closure is provided for said opening and comprises the spaced, parallel, horizontally disposed slats 7 the end portions of which are engageable for rest on the front and rear upper horizontal bars 4. The slats 7 are secured together in a manner to provide a unit through the medium of the transverse connecting bars 8 which are spaced from the ends of said slats 7. The end portions of the connecting bars 8 extend beyond the outermost of the closure slats 7 for rest on the adjacent fixed slats 6, as illustrated to advantage in Figure 2 of the drawings. A trough 9 for the reception of feed or water is secured exteriorly on the lower portion of the front side of the coop, and, if desired, a similar trough may be secured on the lower portion of the rear side of the coop. Sufficient space is provided between the vertical slats 5 of the coop to permit the passage of the heads of the poultry to consume the feed or water from the trough.

Referring now to Figure 3 of the drawings, it will be seen that the reference numeral 10 designates a vertical partition which is also of slat construction and which is removably disposed in the coop in a manner to divide said coop into a pair of compartments. Removably disposed in one end portion of each compartment is a chick box 11 having a centrally disposed opening 12 therein for the passage of the chicks and, as clearly seen in Figure 4 of the drawings, the front wall of each of the boxes 11 is further provided with the ventilating openings 13. It will thus be seen that the coop is adapted for use as a brooder.

All of the slats 5, 6, 7 and the connecting bars 8 together with the slats which constitute the partition 10 are conventional laths or portions of laths for permitting the construction of the coop at a minimum cost and without the necessity of skilled labor. The wire mesh bottom 3 is of suitable gauge to permit the passage of the poultry droppings to the ground or to a pan or other suitable receptacle which may be beneath the coop for the purpose. The coop may be of any suitable size and disposed at any desired elevation with respect to the ground or floor of a building. If desired, a plurality of the coops may be arranged in a series in side abutting engagement with each other. The slats and wire mesh bottom provide proper sanitation and ventilation for the poultry within the coop and also provide ample protection from wind for said poultry.

It is believed that the many advantages of a device in accordance with this invention will be readily understood and although the preferred embodiment of the invention is as illustrated and described, it is to be understood that changes in the details of construction may be had which will fall within the scope of the invention as claimed.

What is claimed is:—

1. A poultry coop of the character described comprising corner posts, horizontal bars extending between the corner posts and secured, at their ends, to said corner posts at intermediate portions thereof, horizontal bars extending between the upper end portions of the corner posts and secured at their ends, to said corner posts, spaced, vertical slats extending between the first and second named horizontal bars and constituting the sides of the coop, spaced, parallel, horizontally disposed slats extending between certain of the second named horizontal bars and secured thereto adjacent opposite sides of the coop, said horizontal slats providing a top for the coop having an opening therein, a closure for the opening comprising spaced, parallel slats having their end portions engageable for rest on said certain second named horizontal bars, connecting bars intersecting the closure slats in spaced relation to the ends thereof and secured thereto, the end portions of the connecting bars extending beyond the outermost of the closure slats for engagement and rest on the adjacent horizontal slats, a wire mesh bottom having its marginal portions secured to the upper sides of the first named horizontal bars, a trough mounted exteriorly on one side of the coop at the bottom portion of said coop, a removable partition disposed vertically in the coop, and boxes removably mounted in the coop on opposite sides of the partition, said boxes having openings therein for the passage of the poultry.

2. In combination, a poultry coop comprising slatted walls, a slatted top and a foraminous bottom, a removable partition disposed vertically in the coop, and boxes removably mounted in the coop on opposite sides of the partition having an opening therein for the passage of the poultry.

In testimony whereof I affix my signature.

LOUIS ANTHONY FEDERER.